United States Patent
Jeong et al.

(10) Patent No.: US 10,275,951 B2
(45) Date of Patent: Apr. 30, 2019

(54) COMMUNICATION CONTROL DEVICE, VEHICLE HAVING THE COMMUNICATION CONTROL DEVICE, AND METHOD FOR CONTROLLING THE VEHICLE

(71) Applicants: HYUNDAI MOTOR COMPANY, Seoul (KR); YURA CORPORATION CO., LTD., Seongnam-si, Gyeonggi-do (KR)

(72) Inventors: Myungsun Jeong, Seoul (KR); Young Jong Lee, Seoul (KR); Soo Mi Kim, Seoul (KR)

(73) Assignees: HYUNDAI MOTOR COMPANY, Seoul (KR); YURA CORPORATION CO., LTD., Seongnam-si, Gyeonggi-do (KR)

( * ) Notice: Subject to any disclaimer, the term of this patent is extended or adjusted under 35 U.S.C. 154(b) by 60 days.

(21) Appl. No.: 15/340,398

(22) Filed: Nov. 1, 2016

(65) Prior Publication Data
US 2017/0365107 A1    Dec. 21, 2017

(30) Foreign Application Priority Data

Jun. 16, 2016  (KR) .................. 10-2016-0074844

(51) Int. Cl.
G07C 5/00 (2006.01)
G07C 5/08 (2006.01)
H04W 4/70 (2018.01)

(52) U.S. Cl.
CPC ............ *G07C 5/008* (2013.01); *G07C 5/085* (2013.01); *H04W 4/70* (2018.02); *G07C 2205/02* (2013.01)

(58) Field of Classification Search
USPC ...................................................... 701/29.1
See application file for complete search history.

(56) References Cited

U.S. PATENT DOCUMENTS

| | | | | |
|---|---|---|---|---|
| 5,949,330 A * | 9/1999 | Hoffman | ............. | B60K 37/02 340/438 |
| 6,768,994 B1 * | 7/2004 | Howard | ............. | G06F 17/3087 |
| 7,103,460 B1 * | 9/2006 | Breed | ............. | B60C 23/0408 701/29.1 |
| 8,984,644 B2 * | 3/2015 | Oliphant | ............. | G06F 21/554 726/25 |
| 8,990,550 B1 * | 3/2015 | Hushon | ............. | H04L 63/0876 713/2 |
| 9,100,431 B2 * | 8/2015 | Oliphant | ............. | G06F 21/57 |
| 9,117,069 B2 * | 8/2015 | Oliphant | ............. | H04L 63/1416 |

(Continued)

FOREIGN PATENT DOCUMENTS

JP    H09250970 A    9/1997
JP    2008-032519 A    2/2008

(Continued)

*Primary Examiner* — Jean Paul Cass
(74) *Attorney, Agent, or Firm* — Morgan, Lewis & Bockius LLP

(57) ABSTRACT

A communication control apparatus includes a communicator for communicating with an electronic control unit (ECU), an interface connected to a diagnostic device, and a controller for activating a security diagnostic routing module when the diagnostic device is initially connected to the interface, and for performing routing between the electronic control unit (ECU) and the diagnostic device using the security diagnostic routing module.

11 Claims, 8 Drawing Sheets

(56) References Cited

U.S. PATENT DOCUMENTS

| | | | |
|---|---|---|---|
| 9,118,708 B2 * | 8/2015 | Oliphant | G06F 21/57 |
| 9,118,709 B2 * | 8/2015 | Oliphant | G06F 21/50 |
| 9,118,710 B2 * | 8/2015 | Oliphant | G06F 21/50 |
| 9,118,711 B2 * | 8/2015 | Oliphant | G06F 21/554 |
| 9,350,752 B2 * | 5/2016 | Oliphant | G06F 21/57 |
| 9,477,843 B2 * | 10/2016 | Nairn | G06F 21/6218 |
| 9,638,758 B2 * | 5/2017 | Wickert | H01M 2/344 |
| 2003/0202663 A1 * | 10/2003 | Hollis | H04L 63/0272 380/282 |
| 2005/0096809 A1 * | 5/2005 | Skeen | G07C 5/008 701/31.4 |
| 2007/0171029 A1 * | 7/2007 | Inbarajan | G06Q 10/00 340/425.5 |
| 2007/0216535 A1 * | 9/2007 | Carrino | G06F 17/3087 340/573.1 |
| 2008/0221748 A1 * | 9/2008 | Kellner | G06F 1/24 701/31.4 |
| 2009/0327821 A1 * | 12/2009 | Bauerle | B60W 50/0205 714/704 |
| 2013/0002424 A1 * | 1/2013 | Haynes | G08B 5/36 340/540 |
| 2013/0277437 A1 * | 10/2013 | Longyear | G06M 1/00 235/91 R |
| 2014/0006555 A1 * | 1/2014 | Shields | H04L 67/12 709/217 |
| 2014/0035592 A1 * | 2/2014 | Wickert | H01M 2/344 324/426 |
| 2014/0038017 A1 * | 2/2014 | Wickert | H01M 2/1072 429/99 |
| 2014/0277998 A1 * | 9/2014 | Martin | B60W 20/50 701/102 |
| 2014/0282470 A1 * | 9/2014 | Buga | G06F 8/65 717/170 |
| 2016/0197932 A1 * | 7/2016 | Hoffman | H04L 63/102 726/4 |
| 2016/0328890 A1 * | 11/2016 | Keane | G07C 5/0808 |
| 2017/0054568 A1 * | 2/2017 | Lee | H04W 16/32 |
| 2017/0365107 A1 * | 12/2017 | Jeong | G07C 5/008 |

FOREIGN PATENT DOCUMENTS

| | | |
|---|---|---|
| KR | 10-2012-0136496 A | 12/2012 |
| KR | 10-2014-0052214 A | 5/2014 |
| KR | 10-2015-0049876 A | 5/2015 |

\* cited by examiner

COMMUNICATION CONTROL DEVICE, VEHICLE HAVING THE COMMUNICATION CONTROL DEVICE, AND METHOD FOR CONTROLLING THE VEHICLE

CROSS-REFERENCE TO RELATED APPLICATION

This application claims the benefit of priority to Korean Patent Application No. 10-2016-0074844, filed on Jun. 16, 2016 with the Korean Intellectual Property Office, the disclosure of which is incorporated herein by reference.

TECHNICAL FIELD

Embodiments of the present disclosure relate to a communication control device for security enhancement, a vehicle including the communication control device, and a method for controlling the vehicle.

BACKGROUND

A vehicle is an apparatus to move on the road by driving of vehicle wheels for the purpose of transporting persons or cargo.

A vehicle can perform basic traveling functions and additional functions for user convenience, for example, an audio function, a video function, a navigation function, an air-conditioning control function, a seat heater control function and a function for communicating with an external terminal, among other functions.

The vehicle may include electronic devices for traveling and other electronic devices for performing various safety functions to enhance safety of a vehicle driver and passengers.

In this case, the plurality of electronic devices may interact with each other.

A manufacturing company of vehicles confirms whether the electronic devices are normally operating using a diagnostic device during vehicle assembly, and diagnoses whether the electronic devices normally interact with each other after completion of vehicle assembly.

The vehicle includes a security function configured to protect the plurality of electronic devices when diagnosing the electronic devices.

A conventional system can diagnose such electronic devices only when a diagnostic device is authenticated by a security function of electronic devices embedded in vehicles, such that additional facilities for authenticating the security function must be provided in all fabrication lines of vehicles, a total fabrication time to be consumed for vehicle fabrication unavoidably increases due to addition of the authentication process, resulting in reduced production yield.

If there is no limitation in security of in-vehicle electronic devices, a third party instead of a repairman may perform tuning of the in-vehicle electronic devices after vehicles are delivered to customers, such that there is a risk to vehicle safety and security.

SUMMARY

Therefore, it is an aspect of the present disclosure to provide a communication control device in which a security diagnosis function is automatically activated when the communication control device is connected to a diagnostic device, a vehicle including the same, and a method for controlling the vehicle.

It is another aspect of the present disclosure to provide a communication control device in which a security diagnosis function is activated when state information of a monitored vehicle satisfies a setup condition, a vehicle including the same, and a method for controlling the vehicle.

Additional aspects of the disclosure will be set forth in part in the description which follows and, in part, will be obvious from the description, or may be learned by practice of the disclosure.

In accordance with one aspect of the present disclosure, a communication control apparatus includes: a communicator configured to communicate with an electronic control unit (ECU); an interface connected to a diagnostic device; and a controller configured to activate a security diagnostic routing module when the diagnostic device is initially connected to the interface, and to perform routing between the electronic control unit (ECU) and the diagnostic device using the security diagnostic routing module.

The controller may authenticate the diagnostic device, perform security diagnostic routing when the diagnostic device is successfully authenticated, and may perform general diagnostic routing when authentication of the diagnostic device fails.

Upon receiving a diagnostic request message in a deactivation state of the security diagnostic routing module, the controller may perform general diagnostic routing between the electronic control unit (ECU) and the diagnostic device using a general diagnostic routing module.

The general diagnostic routing module may include a routing module using a unified diagnostic service (UDS).

The controller may deactivate the general diagnostic routing module when the security diagnostic routing module is activated.

In accordance with another aspect of the present disclosure, a vehicle includes: a plurality of electronic control units (ECUs); and a communication control device configured to perform routing between a diagnostic device for diagnosing the respective ECUs and the plurality of ECUs. The communication control device includes: a communicator configured to communicate with the plurality of ECUs, an interface connected to the diagnostic device, and a controller configured to activate a security diagnostic routing module when the diagnostic device is initially connected to the interface, and to perform security diagnostic routing between the diagnostic device and at least one of the plurality of ECUs using the security diagnostic routing module.

Upon receiving a diagnostic request message in a deactivation state of the security diagnostic routing module, the controller may perform general diagnostic routing between the at least one ECU and the diagnostic device using a general diagnostic routing module.

If the security diagnostic routing module is activated, the controller may deactivate the general diagnostic routing module, authenticate the diagnostic device, and may perform general diagnostic routing through the security diagnostic routing module when authentication of the diagnostic device fails.

In accordance with another aspect of the present disclosure, a vehicle includes: a monitoring unit configured to periodically monitor a vehicle state; a plurality of electronic control units (ECUs); and a communication control device configured to activate the security diagnostic routing module when the monitored vehicle state information satisfies a setup condition of a security diagnostic routing module, and to control routing of at least one ECU from among the plurality of ECUs using the security diagnostic routing module.

The communication control device may include: a communicator configured to communicate with the plurality of ECUs; an interface connected to the diagnostic device; and a controller configured to authenticate the diagnostic device when the diagnostic device is connected to the interface, and to perform routing between the diagnostic device and the at least one ECU using the security diagnostic routing module when the diagnostic device is successfully authenticated.

The monitoring unit may monitor a vehicle speed. The communication control device may confirm time points obtained when the monitored vehicle speed is equal to or higher than a reference speed, may calculate the sum of confirmed time points, and may determine that the setup condition is satisfied when the sum of the time points is equal to or longer than a reference time.

The monitoring unit may monitor the vehicle speed. The communication control device may obtain a mileage of the vehicle on the basis of the monitored vehicle speed, and may determine that the setup condition is satisfied when the obtained mileage is equal to or longer than a reference distance.

The monitoring unit may monitor the number of opening/closing times of doors provided in the vehicle. The communication control device may determine that the setup condition is satisfied when the number of door opening/closing times is equal to or higher than a reference number of door opening/closing times.

The monitoring unit may monitor the number of ignition on/off operations. The communication control device may determine that the setup condition is satisfied when the number of ignition on/off operations is equal to or higher than a reference number of ignition on/off operations.

The monitoring unit may monitor the number of position change times of a gearshift. The communication control device may determine that the setup condition is satisfied when the number of position change times of the gearshift is equal to or higher than a reference number of position change times of the gearshift.

The monitoring unit may monitor the number of manipulation times of a wiper control lever. The communication control device may determine that the setup condition is satisfied when the number of manipulation times of the wiper control lever is equal to or higher than a reference number of manipulation times of the wiper control lever.

The monitoring unit may monitor the number of ON operations of a turn indicator lamp. The communication control device may determine that the setup condition is satisfied when the number of ON operations of the turn indicator lamp is equal to or higher than a reference number of ON operations of the turn indicator.

The monitoring unit may monitor at least two of a speed of the vehicle, a mileage of the vehicle, the number of door opening/closing times, the number of ignition ON/OFF operations, the number of position change times of a gearshift, the number of manipulation times of a wiper control lever, and the number of ON operations of a turn indicator lamp.

The method may further include: if the diagnostic device is connected to the interface of the communication control device, authenticating the diagnostic device; if the diagnostic device is successfully authenticated, controlling a security diagnostic routing between the at least one ECU and the diagnostic device through the communication control device; and if authentication of the diagnostic device fails, denying the security diagnostic routing between the at least one ECU and the diagnostic device through the communication control device.

The method may further include: the step of monitoring the vehicle state includes monitoring at least two of a speed of the vehicle, a mileage of the vehicle, the number of door opening/closing times, the number of ignition ON/OFF operations, the number of position change times of a gearshift, the number of manipulation times of a wiper control lever, and the number of ON operations of a turn indicator lamp.

The method may further include: if the diagnostic device is initially connected to the interface of the communication control device, activating the security diagnostic routing module.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
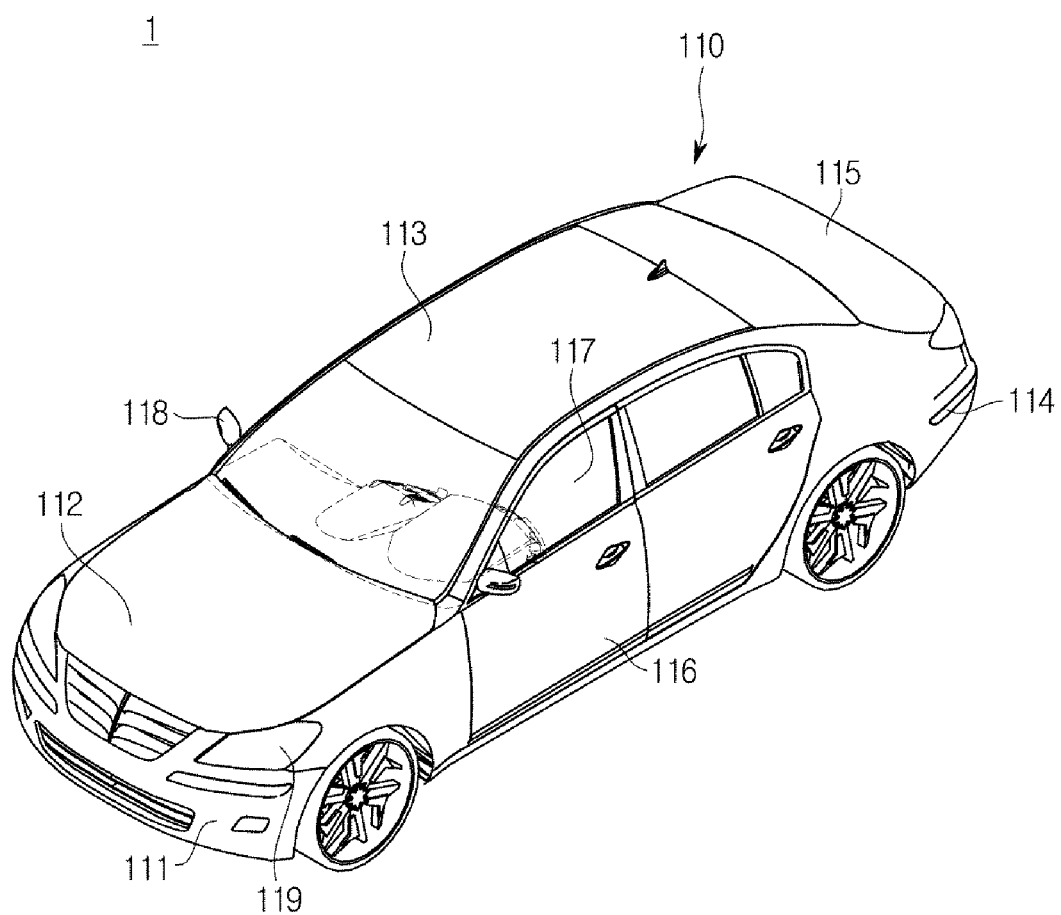
FIG. 1 is a view illustrating an appearance of a vehicle according to an embodiment of the present disclosure.

Reference will now be made in detail to the embodiments of the present disclosure, examples of which are illustrated in the accompanying drawings, wherein like reference numerals refer to like elements throughout.

Figure 2:
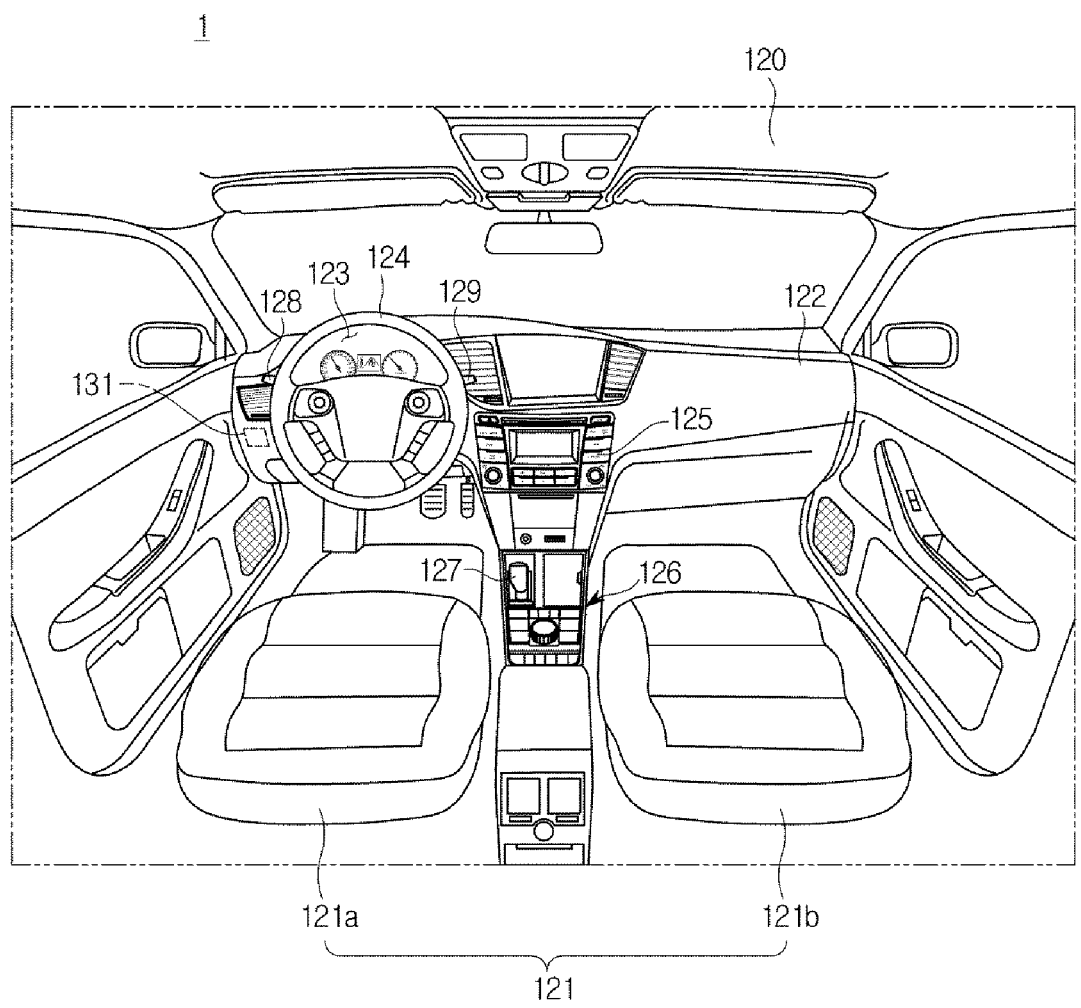
FIG. 2 is a view illustrating an internal structure of the vehicle according to an embodiment of the present disclosure.

FIG. 1 is a view illustrating an appearance of a vehicle according to an embodiment of the present disclosure. FIG. 2 is a view illustrating an internal structure of the vehicle according to an embodiment of the present disclosure.

A vehicle 1 may include a body having interior and exterior parts, and a chassis which is a remaining portion other than the body and is equipped with mechanisms required for driving thereof.

Referring to FIG. 1, the exterior part 110 of the body may include a front panel 111, a bonnet (also called a hood) 112, a roof panel 113, a rear panel 114, a trunk 115, and front-rear and left-right doors 116, window glasses 117 installed at the front-rear and left-right doors 116, and pillars provided at boundaries among the front panel, the bonnet, the roof panel, the rear panel, the trunk, and the window glasses 117 installed at the front-rear and left-right doors.

The exterior part 110 of the vehicle may further include side-view mirrors 118 to provide a rear view of the vehicle 1 to a vehicle driver, and a lamp 119 installed at the front surface and the back surface of the body. The lamp 119 can perform a lamp function which allows a vehicle driver to look forward as well as to view all information of surroundings of the vehicle, and can also perform a signaling and communication function for other vehicles and pedestrians.

The lamp 119 may include a high beam lamp, a low beam lamp, an emergency lamp, a fog lamp, a turn signal lamp, a side lamp indicating a vehicle width, a brake lamp, and a backup lamp. If a driver of the vehicle pushes a brake pedal, the brake lamp can warn another vehicle (i.e., a rear vehicle) of the braked state. When the vehicle is driven in reverse, the backup lamp warns other vehicles or pedestrians of the backward movement of the vehicle.

Referring to FIG. 2, the interior part 120 of the vehicle includes seats (121: 121a, 121b) on which a passenger sits; a dashboard 122; an instrument panel 123 (i.e., a cluster) (including a tachometer, a speedometer, a coolant thermometer, a fuel gauge, indicator lights of various lamps, a warning light, a seat belt warning light, a mileage indicator (or a tripmeter), an odometer, an automatic transmission shift indicator, a door open warning light, an engine oil warning light, and a low fuel warning light, which are arranged on the dashboard to output information related to driving); a steering wheel 124 to adjust a traveling direction of the vehicle; and a center fascia 125 located between the driver's seat 121a and the passenger seat 121b from among the dashboard 122. The center fascia 125 may include a control panel of the audio device and the air conditioner.

The seats 121 may include the driver's seat 121a for a driver, the passenger seat 121b for a fellow passenger, and a rear seat arranged in the rear of the vehicle.

The center fascia 125 may include a head unit for controlling the audio device, the air conditioner, the seat heater, an air vent, a cigarette lighter receptacle, a multi-port, and other elements, therein.

The vehicle 1 may further include an input 126 configured to receive execution commands of various functions.

The input 126 may include an ON-OFF button of respective functions and at least one physical button (such as a button for changing the setting values of respective functions).

The input 126 may be implemented as a jog dial (not shown) or as a touchpad through which the user can input a movement command of a cursor displayed on the display of the vehicle, a selection command, etc.

The vehicle may include a gearshift 127 for allowing a user to select any one of a park mode P, a drive mode D, a reverse mode R, and a neutral mode N so as to change gears of the gearbox.

In this case, the gearbox may be used to change the ratio of an engine rpm (revolutions per minute) to a forward-gear wheel speed, or may be used to change a rate of rotation of the reverse gear.

The vehicle 1 may further include levers respectively arranged at the right and left sides of the steering wheel 124. The levers may include a turn indicator lever 128 to turn on or off the left turn indicator lamp or the right turn indicator lamp, and a wiper control lever 129 to control wipers arranged to contact window glasses.

The vehicle 1 may further include a display and a sound unit. The display may visibly output information regarding a navigation function, a DMB function, an audio function, a video function or a warning function. The sound unit may audibly output information regarding the navigation function, the DMB function, the audio function, the video function or the warning function.

A chassis of the vehicle may further include a power generation device, a power transmission device, a traveling device, a steering device, a brake device, a suspension device, a speed change device, a fuel supply device, safety devices (e.g., an airbag control device, a vehicle dynamic control (VDC) (or electronic stability control (ESC)) device, etc.), and an electronic control unit (ECU) for controlling driving of the above-mentioned devices. The safety devices may be configured to enhance safety of the vehicle driver and passengers.

The vehicle may further include a speed detector to detect speeds of the plurality of wheels, a door opening/closing detector to detect the opening or closing state of the doors, and an acceleration detector to detect acceleration of the vehicle.

Additionally, the vehicle 1 may include a variety of sensing devices, for example, a proximity sensor to detect the presence or absence of obstacles or other vehicles located at the lateral and rear directions of the vehicle 1, a rain sensor to detect the presence or absence of rainfall and the amount of rainfall, etc. The vehicle 1 may further include a yaw rate sensor to detect a variation of angular speed, a gyro sensor, and a steering angle sensor to detect rotation of the steering wheel of the vehicle.

The vehicle 1 may selectively include a lane departure recognition device, a navigation device, a hands-free device, an audio device, a Bluetooth device, a rear-view camera, a charging device including external UE (User Equipment), and a high-pass device, etc. installed for driver convenience.

The vehicle 1 may further include an ignition button configured to input an operation command to the starter motor (not shown).

That is, if the ignition button is switched on, the vehicle 1 may operate the starter motor (not shown), and may drive the engine (not shown) acting as the power generation device using the starter motor.

The vehicle 1 may further include a battery (not shown) that is electrically connected to a vehicle terminal (i.e., a vehicle UE), an audio device, an indoor light, a starter motor, and other electronic devices such that the vehicle UE, the audio device, the dome light, the starter motor, and other electronic devices are powered on.

The battery is a rechargeable battery, and performs charging using a self-generator or engine power during vehicle traveling.

The vehicle 1 may further include a communicator to communicate with at least one of another vehicle, an external server, external infrastructure and an external user equipment (UE).

The communicator of the vehicle may also perform communication between electronic devices contained in the vehicle.

The communicator may perform CAN communication, USB communication, Wi-Fi communication, and Bluetooth communication, may perform broadcast communication (for example, TPEG such as DMB, SXM and RDS), and may further perform 2G, 3G, 4G and 5G communication.

The vehicle may further include a communication control device 130a (also called a Central Gateway) to control communication between the diagnostic device and the plurality of ECUs. The communication control device 130a may include an interface 131 connected to the diagnostic device.

Figure 3:
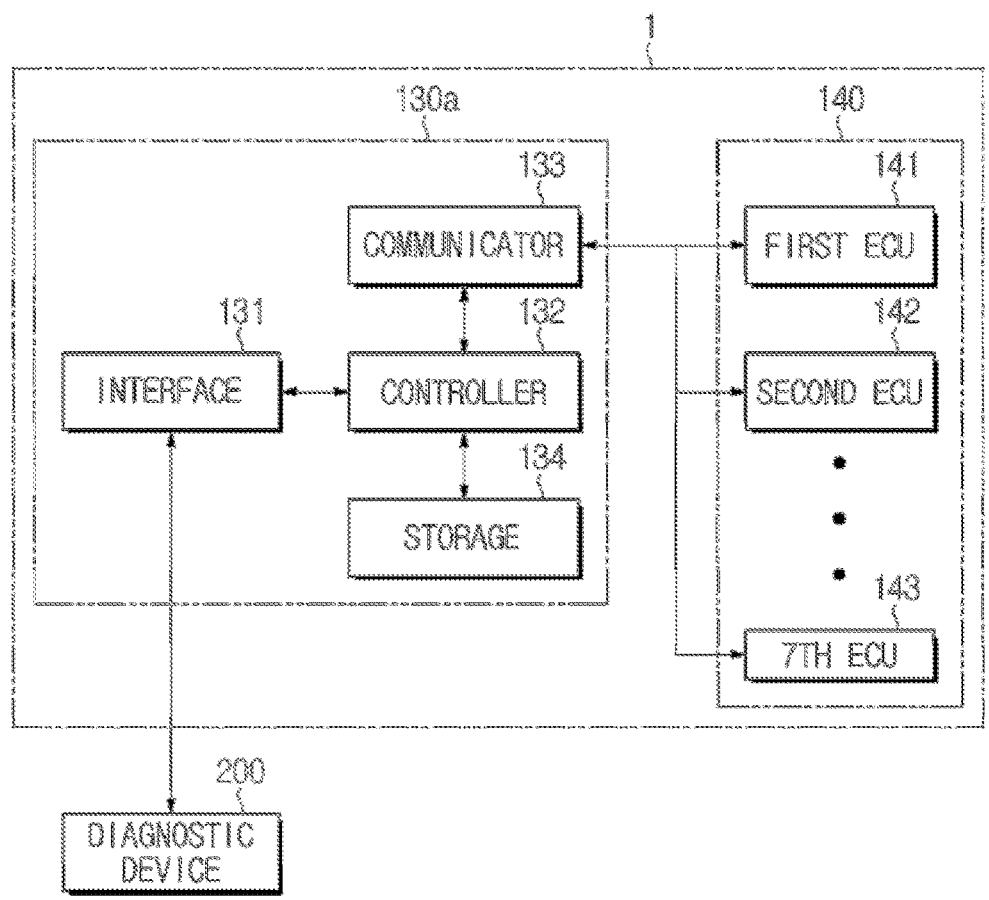
FIG. 3 is a block diagram illustrating a communication control device provided in the vehicle according to an embodiment of the present disclosure.

FIG. 3 is a block diagram illustrating a vehicle according to an embodiment of the present disclosure. Referring to FIG. 3, the vehicle 1 may include an electronic control unit (ECU) unit 140 and a communication control device 130a configured to control communication between the diagnostic device 200 and the ECU 140.

The ECU 140 may include an electronic control unit (ECU) configured to control electronic devices embedded in the vehicle.

For example, the ECU may be a Transmission Control Unit (TCU) ECU, a Tire Pressure Monitoring System (TPMS) ECU, a Motor Driven Power Steering (MDPS) ECU, a Smart Cruise Control (SCC) ECU, an Engine Management System (EMS), an Electronically Controlled Suspension (ECS) ECU, an Anti-lock Braking System (ABS) ECU, an Electronic Parking Brake (EPB) ECU, a Vehicle Dynamic Control (VDC) or an Electronic Stability Program (ESC) ECU.

The ECU 140 may further include the plurality of ECUs.

That is, the plurality of ECUs may include a first ECU 141, a second ECU 142, . . . , an N-th ECU 143.

The communication control device 130a may be used to control communication between at least one ECU and the diagnostic device 200. The communication control device 130a may include an interface 131, a controller 132, a communicator 133 and a storage 134.

The interface 131 may be a physical connection device configured to connect the diagnostic device 200 to the controller 132.

The interface 131 may include a connector to which the diagnostic device 200 is detachably connected.

The connector may be an On-Board Diagnostics (OBD) connector.

The interface 131 may be connected to the controller 132 through CAN communication.

If the diagnostic device 200 is connected to the interface 131, the controller 132 may determine whether the diagnostic device 200 is initially connected to the interface 131. If the diagnostic device 200 is initially connected to the interface 131, a security diagnostic routing module is activated, and a normal diagnostic routing module is deactivated.

In this case, the process for determining whether the diagnostic device 200 is connected to the interface 131 may include determining whether a connection signal of the diagnostic device 200 is received from the interface 131.

The security diagnostic routing module may confirm security of a diagnostic message of the ECU to be routed, may confirm a security level of the diagnostic device, and may determine whether routing is performed according to the confirmation result. The security diagnostic routing module may transmit and receive an information read message, an information write (or change) message, and mandatory operation request messages.

A general diagnostic routing module is a routing module based on a Unified Diagnostic Service (UDS), and is designed to perform routing of a UDS communication message and signal.

The general diagnostic routing module may transmit and receive a read request message of information.

If the general diagnostic routing module is deactivated, use of a general diagnostic routing module may be limited.

Upon receiving a setup signal from the diagnostic device 200, the controller 132 may also activate the security diagnostic routing module.

The controller 132 may authenticate the diagnostic device 200 connected to the interface 131. If the diagnostic device 200 is successfully authenticated, the controller 132 may perform security diagnostic routing between at least one ECU and the diagnostic device 200 using the security diagnostic routing module. If authentication of the diagnostic device 200 fails, the controller 132 may deny routing to the diagnostic device 200. If such routing denial occurs, the controller 132 may transmit routing denial information to the diagnostic device 200. In this case, the diagnostic device 200 may output the routing denial information.

If the controller 132 receives a diagnostic request message from the diagnostic device on the condition that the security diagnostic routing module is deactivated, the controller may also perform general diagnostic routing between at least one ECU and the diagnostic device 200 using the general diagnosis routing module.

Upon receiving the diagnostic request message of at least one ECU through the security diagnostic routing module, the controller 132 may confirm security of the received diagnostic request message, and may also control a transmission of the received diagnostic request message on the basis of the confirmed security and the success or failure of authentication of the diagnostic device.

For example, if the diagnostic request message received after activation of the security diagnostic routing module has high security, the controller 132 may confirm success or failure of authentication of the diagnostic device. If successful authentication of the diagnostic device is decided, the controller 132 may transmit ECU information to the diagnostic device. If authentication failure of the diagnostic device occurs, the controller 132 may deny routing to the ECU. If the diagnostic request message has low security, the controller 132 may transmit ECU information to the diagnostic device irrespective of success or failure of authentication of the diagnostic device.

If authentication failure of the diagnostic device occurs on the condition that the security diagnosis routing module is activated, the controller 132 may also perform general diagnostic routing between the diagnostic device and the ECU information using the security diagnostic routing module.

In this case, the deactivation state of the security diagnosis routing module may be a fabrication processing state of vehicles or may be a state before vehicles are delivered to customers. In this case, the diagnostic device may be an installation device provided in the vehicle fabrication processing space.

The diagnostic request message may include a read request message of information, a change request message of information, a mandatory operation request message, etc.

The operation for performing general diagnostic routing may include transmitting the information read request message from among information of at least one ECU to the diagnostic device.

The operation for performing general diagnostic routing may include, upon receiving the information change request message or the mandatory operation request message of the electronic device from the diagnostic device, denying routing to at least one ECU.

The communicator 133 may perform communication between the controller 135 and the plurality of ECUs (141, 142 143).

The communicator 133 may include CAN communication, and the CAN communication may include low-speed CAN communication and high-speed CAN communication.

The storage 134 may store identification (ID) information of the diagnostic device 200 configured to authenticate the diagnostic device 200.

The storage 134 may store various diagnostic trouble codes (DTCs) caused by defects of several ECUs and the communication problem.

The storage 134 may be incorporated with the controller 132, or may be separated from the controller 132.

The diagnostic device 200 may diagnose the plurality of electronic devices embedded in the vehicle during the vehicle fabrication process. After the vehicle is delivered to a customer, the diagnostic device 200 is manipulated by a repairman of a service center or the like, such that it can diagnose the plurality of electronic devices embedded in the vehicle.

The diagnostic device 200 communicates with each ECU of the plurality of electronic devices using the general diagnostic routing module of the communication control device 130a when diagnosing the plurality of electronic devices embedded in the vehicle during the vehicle fabrication process, such that it can diagnose each ECU.

The diagnostic device 200 may perform diagnosis to recognize whether or not each ECU of the plurality of electronic devices assembled in the vehicle fabrication process is smoothly operated.

Through the above-mentioned diagnosis, the diagnostic device 200 can recognize whether or not the respective electronic devices are smoothly operated. After the electronic devices are completely assembled, the diagnostic device 200 can recognize whether one electronic device is smoothly interoperable with other electronic devices.

After the vehicle is delivered to a customer, the diagnostic device 200 communicates with ECUs of the plurality of electronic devices using the security diagnostic routing module of the communication control device 130a, and at the same time can diagnose the respective ECUs.

For example, assuming that the ignition button of the vehicle is switched on when the diagnostic device 200 is connected to the interface 131 of the communication control device 130a, battery power is supplied to each ECU such that each ECU is awakened. As a result, communication between the respective ECUs is initiated, and at the same time the diagnostic code of each ECU can be confirmed during such communication.

The diagnostic device 200 may transmit a connection signal to the communication control device when connecting to the interface of the communication control device.

The diagnostic device 200 may also transmit a setup signal to the communication control device.

The operation for transmitting the setup signal may include, when a user command is input to the diagnostic device, transmitting the setup signal to the communication control device 130a on the basis of the user command.

The diagnostic device 200 may output diagnostic information of the ECUs, routing denial information, etc.

The diagnostic device 200 may store ID information, and may have a security level capable of accessing the plurality of ECUs through the communication control device.

The diagnostic device 200 may transmit a diagnostic request message of at least one ECU to the communication control device. In this case, the communication control device 130a may perform or deny routing between each ECU and the diagnostic device on the basis of a success or failure of authentication of the activated diagnostic routing module and the diagnostic device.

Figure 4:
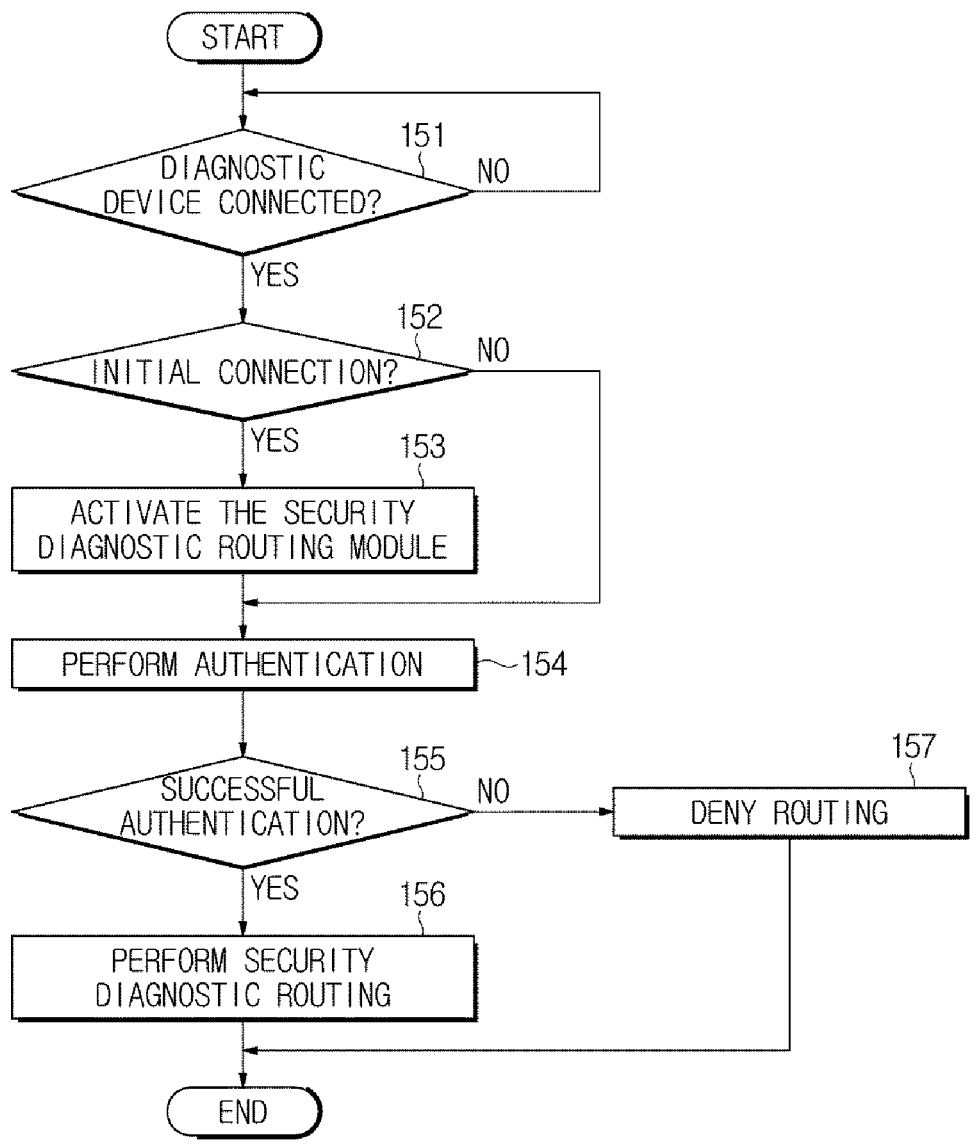
FIG. 4 is a flowchart illustrating a method for controlling a vehicle according to another embodiment of the present disclosure.

FIG. 4 is a flowchart illustrating a method for controlling a vehicle according to another embodiment of the present disclosure.

Referring to FIG. 4, the communication control device embedded in the vehicle 1 may determine whether the diagnostic device 200 is connected to the interface 131 in operation 151. If the diagnostic device is connected to the interface 131, the communication control device may determine whether a current connection is an initial connection in operation 152.

If the diagnostic device 200 is initially connected to the interface 131, the communication control device may activate the security diagnostic routing module in operation 153, and may deactivate the general diagnostic routing module.

In this case, the operation for determining whether the diagnostic device 200 is connected to the interface 131 may include determining whether the connection signal of the diagnostic device 200 is received from the interface 131.

The operation for initially connecting the diagnostic device 200 to the interface 131 may include initially connecting the diagnostic device 200 to the interface 131 when the security diagnostic routing module is deactivated.

Such initial connection between the diagnostic device 200 and the interface 31 may indicate that the diagnostic device 200 is connected to the interface 131 after the vehicle is delivered to the customer.

If the security diagnostic routing module is activated when the communication control device 130a is connected to the diagnostic device, the communication control device 130a may omit the operation for determining the presence or absence of an initial connection of the diagnostic device 200.

The communication control device 130a may authenticate the diagnostic device 200 connected to the interface 131 in operation 154, and may determine a success or a failure of authentication of the diagnostic device 200 in operation 155. If the diagnostic device 200 is successfully authenticated, the communication control device 130a may perform security diagnostic routing between at least one ECU and the diagnostic device 200 using the security diagnostic routing module in operation 156.

If the diagnostic device 200 is successfully authenticated on the condition that the security diagnostic routing module is activated, the communication control device 130a may transmit all messages needed to diagnose the ECUs to the diagnostic device 200.

If authentication failure of the diagnostic device 200 occurs when the security diagnostic routing module is activated, the communication control device 130a may deny security diagnostic routing to the diagnostic device 200 in operation 157. In this case, the communication control device may transmit security diagnostic routing denial information to the diagnostic device 200.

The operation for performing security diagnostic routing between at least one ECU and the diagnostic device 200 using the security diagnostic routing module may include: upon receiving a diagnostic request message of at least one ECU through the security diagnostic routing module, confirming data security of the diagnostic request message of the ECU to be routed; confirming a security level of the diagnostic device; and performing a security diagnostic function to determine whether routing is performed on the basis of the confirmation result.

For example, if any one ECU requests reprogramming or variant coding diagnosis, the communication control device 130a may authenticate the diagnostic device 200. If successful authentication is achieved, the communication control device 130a may perform the security diagnostic routing between the diagnostic device and any one ECU. If authentication failure occurs, the communication control device 130a may deny security diagnostic routing.

The operation for denying security diagnostic routing to the diagnostic device 200 may include transmitting only low-security readable information from among ECU information to the diagnostic device 200, and blocking transmission of high-security information.

If the security diagnostic routing module is deactivated, the communication control device may perform general diagnostic routing between at least one ECU and the diagnostic device 200 using the general diagnostic routing module.

The operation for performing general diagnostic routing between the at least one ECU and the diagnostic device 200 using the general diagnostic routing module includes providing information to be open to the public by regulations. In this case, only low-security readable information from among ECU information may be transmitted to the diagnostic device 200.

Figure 5:
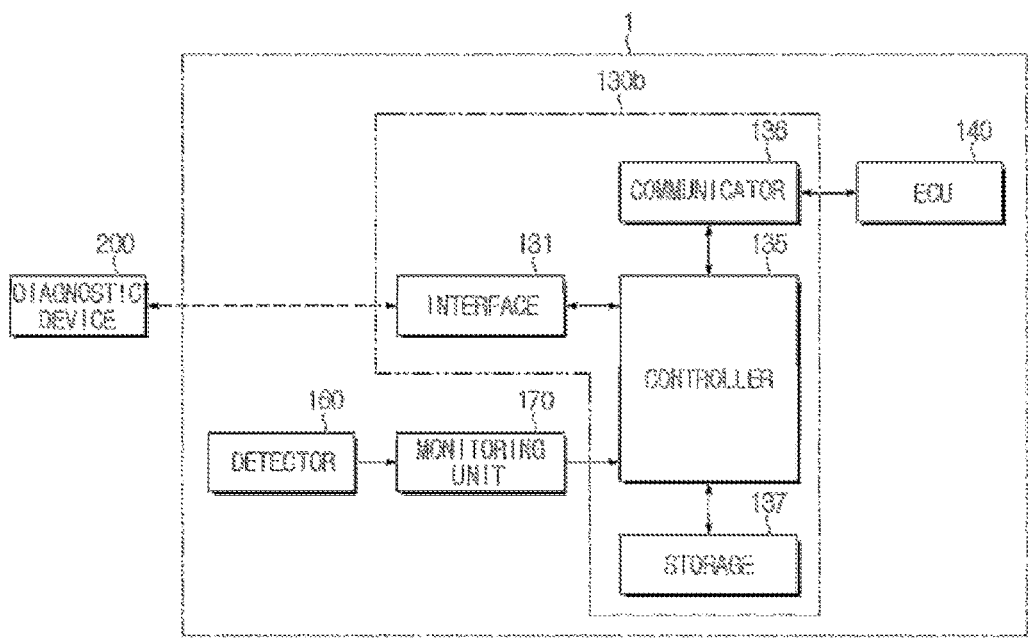
FIG. 5 is a block diagram illustrating a vehicle according to another embodiment of the present disclosure.

FIG. 5 is a block diagram illustrating a vehicle according to another embodiment of the present disclosure. Referring to FIG. 5, the vehicle 1 may include an electronic control unit (ECU) 140, a communication control device 130b configured to control communication between the diagnostic device 200 and the ECU 140, a detector 160 and a monitoring unit 170.

A detailed description of the above-mentioned components illustrated in FIG. 5 will hereinafter be given with reference to FIGS. 6 and 7.

Figure 6:
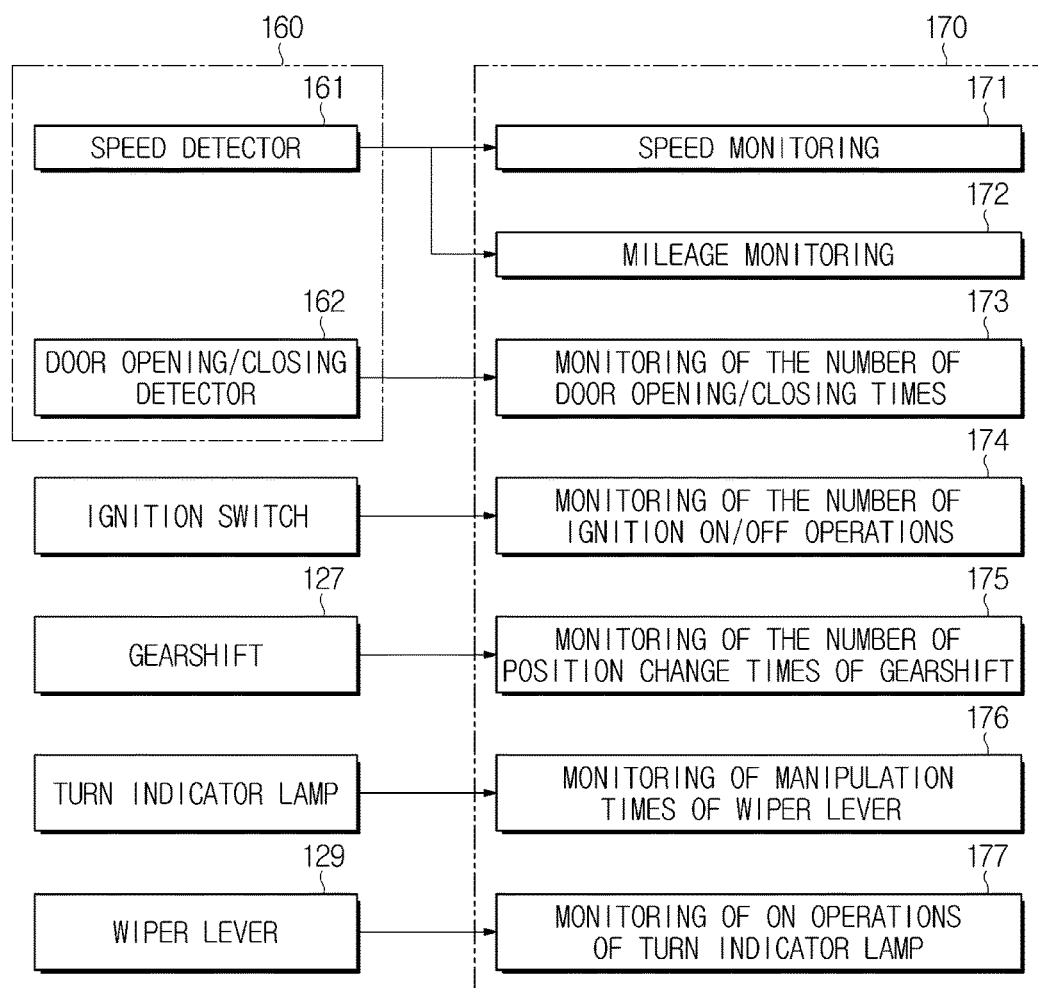
FIG. 6 is a detailed block diagram illustrating a monitoring unit contained in the vehicle according to another embodiment of the present disclosure.

FIG. 6 is a detailed block diagram illustrating the monitoring unit according to another embodiment of the present disclosure. FIG. 7 is a block diagram illustrating the controller according to another embodiment of the present disclosure.

The ECU 140 may include one or more ECUs.

For example, the ECU may be a Transmission Control Unit (TCU) ECU, a Tire Pressure Monitoring System (TPMS) ECU, a Motor Driven Power Steering (MDPS) ECU, a Smart Cruise Control (SCC) ECU, an Engine Management System (EMS), an Electronically Controlled Suspension (ECS) ECU, an Anti-lock Braking System (ABS) ECU, an Electronic Parking Brake (EPB) ECU, a Vehicle Dynamic Control (VDC) or Electronic Stability Program (ESC) ECU.

The detector 160 may detect a vehicle state.

Referring to FIG. 6, the detector 160 may include a speed detector 161 to detect a wheel speed of the vehicle, and may include a door opening/closing detector 162 to detect opening or closing of vehicle doors.

The detector 160 may also detect ignition ON/OFF states, the position of a gearshift, manipulation of the wiper control lever, and an ON state of the turn indicator lamp.

The monitoring unit 170 may periodically monitor a vehicle state, and may transmit the monitored vehicle state information to the communication control device 130b.

The monitoring unit 170 may monitor any one of a vehicle speed, vehicle mileage, the number of door opening/closing times, the number of ignition ON/OFF operations, the number of position change times of the gearshift, the number of manipulation times of the wiper control lever and the number of ON times of the turn indicator lamp.

Referring to FIG. 6, the monitoring unit 170 may include a vehicle speed monitoring part 171, a vehicle mileage monitoring part 172, a part 173 for monitoring the number of door opening/closing times, a part 174 for monitoring the number of ignition ON/OFF operations, the part 175 for monitoring the number of position change times of the gearshift 127, the part 176 for monitoring the number of manipulation times of the wiper control lever 129, and the part 177 for monitoring the number of ON operations of the turn indicator lamp corresponding to a manipulation of the turn indicator lever 128.

The monitoring unit 170 may also monitor at least two of the vehicle speed, the vehicle mileage, the number of door opening/closing times, the number of ignition ON/OFF operations, the number of position change times of the gearshift, the number of manipulation times of the wiper control lever, and the number of ON times of the turn indicator lamp.

In this case, the monitoring unit 170 may be a separate ECU different from the ECUs contained in the ECU 140, and may communicate with the controller 135 of the communication control device through CAN communication.

The reason why vehicle state information is monitored is to recognize whether a current time is a time point after the vehicle is delivered to a customer.

The communication control device 130b may be a communication control device disposed between at least one ECU and the diagnostic device 200. The communication control device 130b may include an interface 131, a controller 135, a communicator 136 and a storage 137. The interface 131 may be a physical connection device for connecting the diagnostic device 200 to the controller 135.

The interface 131 may include a connector to which the diagnostic device 200 is detachably connected.

In this case, the connector may be an On-Board Diagnostics (OBD) connector.

The interface 131 may be connected to the controller 135 through CAN communication.

Figure 7:
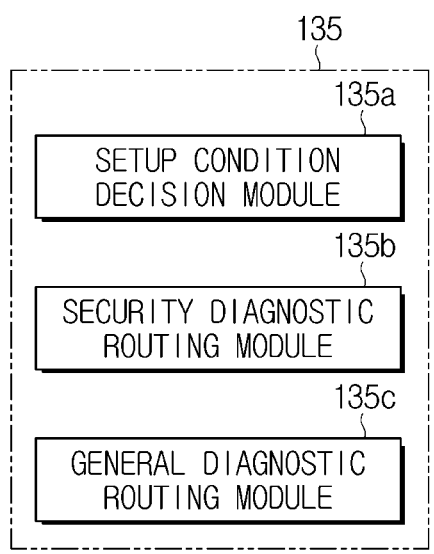
FIG. 7 is a block diagram illustrating a controller of the communication control device provided in the vehicle according to another embodiment of the present disclosure.

Referring to FIG. 7, the controller 135 may include a setup condition decision module 135a to determine whether the setup condition of the security diagnostic routing module is satisfied, and the security diagnostic routing module 135b performs a security diagnostic function, and a general diagnostic routing module 135c performs a general diagnostic function.

The setup condition decision module 135a of the controller 135 may determine whether vehicle state information satisfies the setup condition of the security diagnostic routing module on the basis of the monitored vehicle state information.

In this case, a structure for determining whether the monitored vehicle state information satisfies the setup condition of the security diagnostic routing module will hereinafter be described.

(1) The controller 135 may confirm time points at which the monitored vehicle speed is equal to or higher than a reference speed, and may calculate the sum of the time points. If the sum of time points is equal to or higher than a reference time, the controller 135 may determine that the setup condition was satisfied.

(2) The controller 135 may obtain the vehicle mileage on the basis of the monitored vehicle speed and the vehicle traveling time. If the obtained mileage is equal to or longer than a reference distance, the controller 135 may determine that the setup condition was satisfied.

(3) The controller 135 may confirm a vehicle mileage of the cluster. If the confirmed vehicle mileage is equal to or longer than a reference distance, the controller 135 may determine that the setup condition is satisfied.

(4) If the number of door opening/closing times is equal to or higher than a reference number of door opening/closing times, the controller 135 may determine that the setup condition is satisfied. In this case, the controller 135 may use the number of door opening times or the number of door closing times.

(5) If the number of ignition ON/OFF operations is equal to or higher than a reference number of ignition ON/OFF operations, the controller 135 may determine that the setup condition is satisfied. In this case, the controller 135 may use the number of ignition ON times or the number of ignition OFF times. In this case, the ignition ON/OFF states may be determined on the basis of a contact point state of the ignition switch.

(6) If the number of position change times of the gearshift is equal to or higher than a reference number of position change times of the gearshift, the controller 135 may determine that the setup condition is satisfied. In this case, the position change of the gearshift may correspond to any one of the park mode P, the drive mode D, the reverse mode R and the neutral mode N.

(7) If the number of manipulation times of the wiper control lever is equal to or higher than a reference number of manipulation times of the wiper control lever, the controller 135 may determine that the setup condition is satisfied.

(8) If the number of ON operations of the turn indicator lamp is equal to or higher than a reference number of ON operations of the turn indicator lamp, the controller 135 may determine that the setup condition is satisfied. In this case, the turn indicator lamp may be a right turn indicator lamp or a left turn indicator lamp.

(9) The controller 135 may select at least two decision structures from among the above-mentioned decision structures (1) to (8), and may also determine whether the setup condition is satisfied on the basis of the at least two selected decision structures.

(10) The controller 135 may check all the decision structures (1) to (8). If any one of the decision structures (1) to (8) satisfies the setup condition, the controller 135 may also activate the security diagnostic routing module.

If the vehicle state satisfies the setup condition of the security diagnostic routing module, the controller 135 may activate the security diagnostic routing module 135b and may deactivate the general diagnostic routing module 135c.

If the diagnostic device 200 is connected to the interface 131 on the condition that the vehicle state does not satisfy the setup condition, the controller 135 determines whether the diagnostic device 200 is initially connected to the interface 131. If the diagnostic device 200 is initially connected to the interface 131, the controller 135 may activate the security diagnostic routing module, and may also deactivate the general diagnostic routing module.

As a result, the security diagnostic routing module of the communication control device 130b can be automatically activated after the vehicle is delivered to the customer.

The controller 135 may control routing of at least one ECU from among the plurality of ECUs using the security diagnostic routing module.

In this case, the operation for determining whether the diagnostic device 200 is connected to the interface 131 may include determining whether a connection signal of the diagnostic device 200 is received from the interface 131.

The operation for determining the presence or absence of an initial connection state of the diagnostic device 200 may include confirming the initial connection state when the connection signal of the diagnostic device is received in a deactivation state of the security diagnostic routing module.

The security diagnostic routing module may confirm data security of the diagnostic request message of the ECU to be routed, may confirm a security level of the diagnostic device, and may determine whether such routing is performed on the basis of confirmation result. The security diagnostic routing module may transmit and receive an information read request message, an information write (or change) request message, and mandatory operation request messages.

The general diagnostic routing module is a routing module based on a Unified Diagnostic Service (UDS), and may perform routing of UDS communication messages and signals.

The general diagnostic routing module may transmit and receive the information read request message.

In addition, if the general diagnostic routing module is deactivated, use of the general diagnostic routing module may be limited.

The controller 135 may authenticate the diagnostic device 200 connected to the interface 131. Upon successful authentication of the diagnostic device 200, the controller 135 may perform routing between at least one ECU and the diagnostic device 200 using the security diagnostic routing module. If an authentication failure of the diagnostic device 200 occurs, the controller 135 may deny routing to the diagnostic device 200.

If such routing is denied, the controller 135 may transmit routing denial information to the diagnostic device 200. In this case, the diagnostic device 200 may output routing denial information.

In addition, upon receiving a diagnostic request message of at least one ECU through the security diagnostic routing module, the controller 135 may confirm security of the received diagnostic request message, and may also control a transmission of the received diagnostic request message on the basis of the confirmed security and the success or failure of authentication of the diagnostic device.

For example, if the received diagnostic request message has high security on the condition that the security diagnostic routing module is activated, the controller 135 may confirm whether the diagnostic device is successfully authenticated. If the diagnostic device is successfully authenticated, the controller 135 may transmit ECU information to the diagnostic device. If authentication failure of the diagnostic device occurs, the controller 135 may deny routing to the ECU. If the diagnostic request message has low security, the controller may transmit ECU information to the diagnostic device irrespective of success or failure of the diagnostic device.

If authentication failure of the diagnostic device occurs when the security diagnostic routing module is activated, the controller 135 may perform general diagnostic routing of ECU information between the diagnostic device and the ECU using the security diagnostic routing module.

The controller 135 may determine whether reprogramming or variant coding of the ECU is performed. If reprogramming or variant coding is performed in any one of the ECUs, the controller 135 may request communication interruption from the remaining ECUs. If communication interruption of the remaining ECUs is completed, the controller 135 may perform routing between the diagnostic device and any one electronic control device.

Upon receiving the diagnostic request message from the diagnostic device in a deactivation state of the security diagnostic routing module, the controller 135 may perform general diagnostic routing between at least one ECU and the diagnostic device 200 using the general diagnostic routing module.

In this case, the deactivation state of the security diagnostic routing module may be a vehicle fabrication processing state or may be a state before the vehicle is delivered to the customer.

The diagnostic request message may include the information read request message, the information change request message, and the mandatory operation request message of the electronic device, etc.

The operation for performing the general diagnostic routing may include transmitting the request message of reading low-security information from among information of at least one ECU to the diagnostic device.

The operation for performing the general diagnostic routing may include denying routing to at least one ECU, upon receiving the information change request message or the mandatory operation request message of the electronic device from the diagnostic device.

Diagnostic CAN communication between the controller of the communication control device and the ECU may be one-to-one (1:1) communication, and may be achieved in the order of a request action of the diagnostic device and then a response action of the ECU through the communication device.

The communicator 136 may perform communication between the controller 135 and the plurality of ECUs.

The communicator 136 may include CAN communication, and the CAN communication may include low-speed CAN communication and high-speed CAN communication.

The storage 137 may store ID information of the diagnostic device 200 configured to authenticate the diagnostic device 200.

The storage 137 may store various kinds of diagnostic trouble codes (DTCs) caused by defects of several ECUs and the communication problem.

The storage 137 may store reference information needed to determine whether the setup condition is satisfied.

In this case, the reference information may include a vehicle reference speed, a reference time, a reference distance, a reference number of door opening/closing times, a reference number of ignition ON/OFF operations, a reference number of change times of the gearshift, a reference number of manipulations of the wiper control lever and a reference number of ON operations of the turn indicator lamp.

The storage 137 may be incorporated with the controller 135, or may be separated from the controller 135.

The diagnostic device 200 may diagnose the plurality of electronic devices embedded in the vehicle during the vehicle fabrication process. After the vehicle is delivered to the customer, the diagnostic device 200 is manipulated by a repairman of the service center or the like, such that the diagnostic device 200 can diagnose the plurality of electronic devices embedded in the vehicle.

The diagnostic device 200 can communicate with each ECU of the plurality of electronic devices using the security diagnostic routing module of the communication control device 130b after the vehicle was delivered to the customer, and at the same time can diagnose the plurality of ECUs.

If the diagnostic device 200 is connected to the interface of the communication control device, the diagnostic device 200 may transmit a connection signal to the communication control device.

The diagnostic device 200 may also transmit the setup signal to the communication control device.

The operation for transmitting the setup signal may include, if a user command is input to the diagnostic device, transmitting the setup signal to the communication control device 130b on the basis of the user command.

The diagnostic device 200 may output diagnostic information and routing denial information of the ECU.

The diagnostic device 200 may store ID information, and may have a security level for allowing the diagnostic device 200 to access the plurality of ECUs through the communication control device.

In order to determine a time point after the vehicle is delivered to the customer, the diagnostic device according to another embodiment may use the result of monitoring the number of usage times of a high-pass device, the result of monitoring the number of detection times of passengers on the seat, the result of monitoring the number of fastening-releasing times of seat belts, the result of monitoring whether the external terminal (UE) is established through Bluetooth communication, the result of monitoring the number of manipulation times of the navigation device, the result of monitoring manipulation times of the radio and the result of monitoring temperature manipulation times of the air conditioner.

Figure 8:
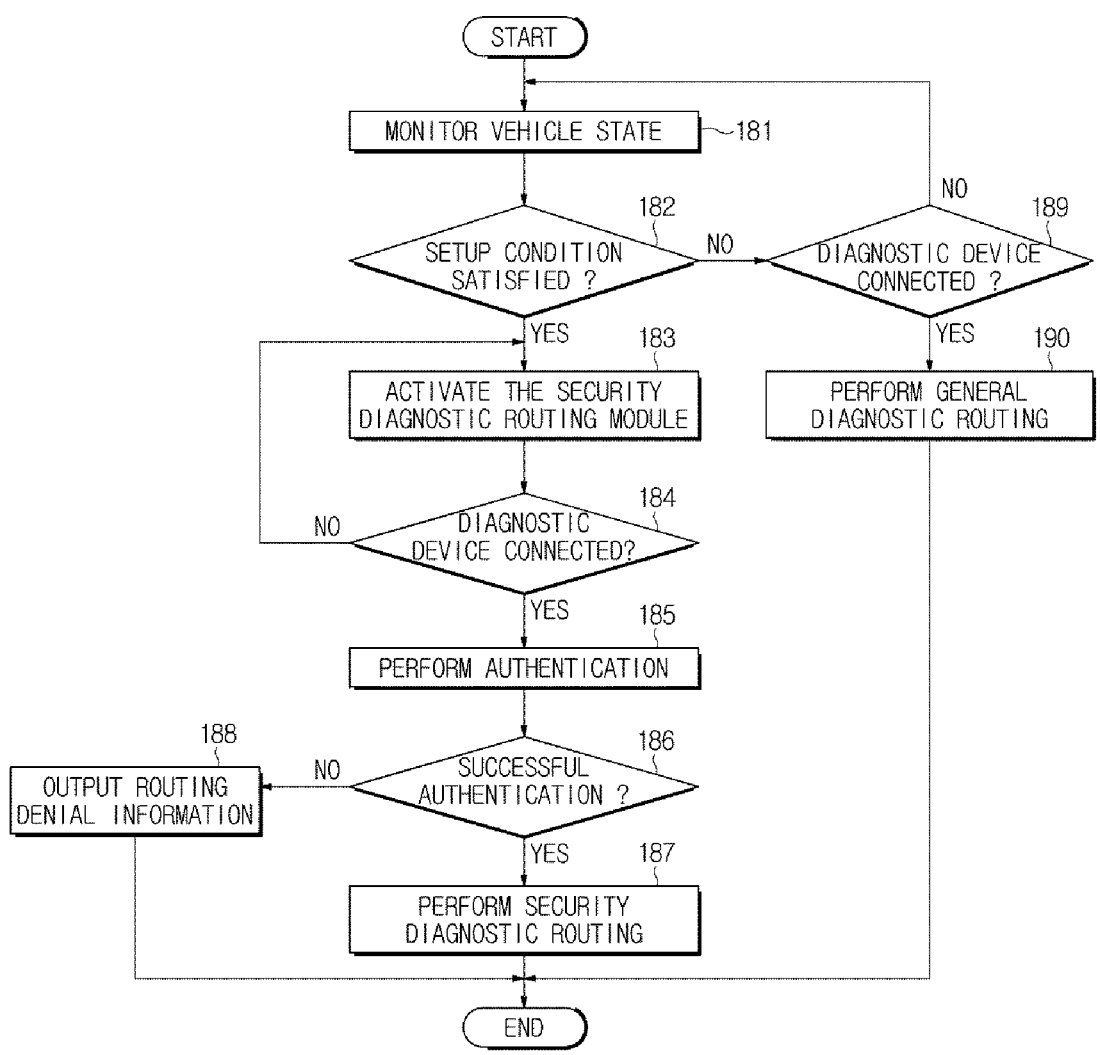
FIG. 8 is a flowchart illustrating a method for controlling the vehicle according to another embodiment of the present disclosure.

FIG. 8 is a flowchart illustrating a method for controlling the vehicle according to another embodiment of the present disclosure.

Referring to FIG. 8, the vehicle may monitor the vehicle state using the monitoring unit in operation 181.

In this case, the operation for monitoring the vehicle state may include monitoring at least one of a vehicle speed, a vehicle mileage, the number of door opening/closing times, the number of ignition ON/OFF operations, the number of position change times of the gearshift, the number of manipulation times of the wiper control lever, and the number of ON times of the turn indicator lamp.

The communication control device 130b may determine whether a current time is after the vehicle is delivered to the customer on the basis of the monitored vehicle state. If the current time is after delivery of the vehicle to the customer, the communication control device 130b may determine that the setup condition of the security diagnostic routing module is satisfied in operation 182, and may activate the security diagnostic routing module 183.

In this case, the communication control device 130b may deactivate the general diagnostic routing module when the security diagnostic routing module 135b is completely activated.

If the general diagnostic routing module is deactivated, use of the general diagnostic routing module may be limited.

The structure for determining whether the setup condition is satisfied is identical to the decision structure of the controller 135 illustrated in FIG. 5, and as such a detailed description thereof will herein be omitted for convenience of description.

If the diagnostic device 200 is connected to the interface 131 on the condition that the vehicle state does not satisfy the setup condition, the communication control device 130b may activate the security diagnostic routing module. If the security diagnostic routing module is completely activated, the diagnostic device 200 may deactivate the general diagnostic routing module.

In this case, the operation for determining whether the diagnostic device 200 is connected to the interface 131 may include determining whether the connection signal of the diagnostic device 200 is received from the interface 131.

As a result, after the vehicle is delivered to the customer, the security diagnostic routing module of the communication control device 130b may be activated.

The communication control device 130b may control routing of at least one ECU from among the plurality of ECUs using the security diagnostic routing module.

The security diagnostic routing module may confirm data security of the diagnostic message of the ECU to be routed, may confirm the security level of the diagnostic device, and may determine whether routing is performed on the basis of confirmation result. The security diagnostic routing module may read or write information of the ECU using the diagnostic device.

If the diagnostic device 200 is connected to the interface 131 in operation 185, the communication control device 130b may authenticate the diagnostic device 200 connected to the interface 131 in operation 185. If the diagnostic device 200 is successfully authenticated in operation 186, the communication control device 130b performs the security diagnostic routing between at least one ECU and the diagnostic device 200 using the security diagnostic routing module in operation 187. If authentication failure of the diagnostic device 200 occurs, the communication control device 130b may output routing denial information to the diagnostic device 200 in operation 188.

That is, if the diagnostic device 200 is successfully authenticated on the condition that the security diagnostic routing module is activated, the communication control device 130b may transmit all messages needed to diagnose the ECU to the diagnostic device 200.

However, if authentication failure of the diagnostic device 200 occurs when the security diagnostic routing module is activated, the communication control device may deny security diagnostic routing to the diagnostic device 200.

The operation for performing the security diagnostic routing between at least one ECU and the diagnostic device 200 using the security diagnostic routing module may include, upon receiving a diagnostic request message of at least one ECU through the security diagnostic routing module, confirming data security of the diagnostic request message of the ECU to be routed; confirming the security level of the diagnostic device; and performing the security diagnostic function for determining whether routing is performed on the basis of the confirmation result.

For example, if the communication control device 130b receives the request for diagnosing reprogramming or variant coding from any one of the ECUs, the communication control device 130b may authenticate the diagnostic device 200. If the diagnostic device 200 is successfully authenticated, the communication control device 130b performs security diagnostic routing between the diagnostic device and any one of the ECUs. If authentication failure of the diagnostic device 200 occurs, the communication control device 130b may deny security diagnostic routing.

The operation for denying the security diagnostic routing to the diagnostic device 200 may include transmitting only low-security readable information from among ECU information to the diagnostic device 200, and blocking transmissions of the remaining high-security information.

If the security diagnostic routing module is deactivated, the communication control device 130b may perform general diagnostic routing between at least one ECU and the diagnostic device 200 using the general diagnostic routing module.

The operation for performing the general diagnostic routing between the diagnostic device 200 and at least one ECU using the general diagnostic routing module may include providing information to be open to the public by regulations. In this case, only low-security readable information from among ECU information may be transmitted to the diagnostic device 200.

The communication control device 130b may also authenticate the diagnostic device only when reprogramming or variant coding of the ECU is performed.

If the diagnostic request message requested by the diagnostic device is the readable information of the ECU information, the communication control device 130b may provide the ECU information to the diagnostic device without authenticating the diagnostic device.

If the diagnostic device is connected to the communication control device 130b in operation 189 on the condition that the setup condition of the security diagnostic routing module is not satisfied, the communication control device 130b may perform general diagnostic routing between the diagnostic device and the ECU using the general diagnostic routing module in operation 190.

In this case, the general diagnostic routing module is a module for performing routing using the Unified Diagnostic Service (UDS).

The operation for performing general diagnostic routing may include receiving information, the security level of which is less than a reference security level, from among the ECU information, and transmitting the received information to the diagnostic device 200.

As described above, the embodiments may automatically recognize a time after the vehicle is delivered to the customer, and may activate the security diagnostic routing module of the communication control device, such that vehicle productivity can be improved before the vehicle is delivered to the customer and a high-risk function can be prevented to protect the vehicle after the vehicle is delivered to the customer.

In addition, the embodiments do not require the use of additional facilities for authenticating the security function or additional fabrication consumption time needed for such authentication during the vehicle fabrication process, such that vehicles can be manufactured using a minimum number of fabrication procedures.

As is apparent from the above description, the present disclosure activates a security diagnosis routing module by automatically recognizing a time after the vehicle is delivered to customers, such that the present disclosure can improve productivity before vehicle delivery to customers, and can prevent activation of a dangerous function so as to guarantee vehicle safety after delivery of the vehicle to customers.

The present disclosure need not use additional facilities for authenticating the security function and an additional production consumption time needed for such authentication during fabrication of vehicles, such that vehicles can be manufactured with a minimum number of fabrication processes.

That is, the present disclosure does not require additional facility investment, and may reuse typical production facilities.

In addition, the present disclosure does not require additional facilities for mandatorily activating the security diagnosis routing module after completion of vehicle delivery to customers, there is no need to educate repairmen for such additional facilities, and additional activation management for activating the security diagnosis routing module is unnecessary, resulting in increased production management convenience.

Accordingly, the present disclosure can enhance productivity, safety, and security for overall vehicle states acquired before or after the vehicle is delivered to customers.

As described above, the present disclosure can improve quality and marketability of vehicles configured to perform the security diagnosis function after vehicles are delivered to customers, can improve user satisfaction, user convenience and vehicle convenience and vehicle safety, and can guarantee product competitiveness.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a monitoring unit for periodically monitoring a vehicle state;
a plurality of electronic control units (ECUs); and
a communication control device configured to activate the security diagnostic routing module when the monitored vehicle state information satisfies a setup condition of a security diagnostic routing module, and to control routing of at least one ECU from among the plurality of ECUs using the security diagnostic routing module,
wherein the monitored vehicle state information does not satisfy the setup condition of the security diagnostic routing module, the communication control device controls general diagnostic routing between the diagnostic device and the at least one ECU using a general diagnostic routing module; and when the security diagnostic routing module is activated, deactivates the diagnostic routing module,
wherein the monitoring unit monitors a vehicle speed and the number of opening/closing times of doors provided in the vehicle; and
the communication control device obtains a mileage of the vehicle on the basis of the monitored vehicle speed, determines that the setup condition is satisfied when the obtained mileage is equal to or longer than a reference distance, and determines that the setup condition is satisfied when the number of door opening/closing times is equal to or higher than a reference number of door opening/closing times.

2. The vehicle according to claim 1, wherein the communication control device includes a communicator for communicating with the plurality of ECUs;
an interface connected to the diagnostic device; and
a controller for authenticating the diagnostic device when the diagnostic device is connected to the interface, and for performing routing between the diagnostic device and the at least one ECU using the security diagnostic routing module when the diagnostic device is successfully authenticated.

3. The vehicle according to claim 1, wherein
the communication control device confirms time points obtained when the monitored vehicle speed is equal to or higher than a reference speed, calculates the sum of confirmed time points, and determines that the setup condition is satisfied when the sum of the time points is equal to or longer than a reference time.

4. The vehicle according to claim 1, wherein the monitoring unit monitors the number of ignition on/off operations; and
the communication control device determines that the setup condition is satisfied when the number of ignition on/off operations is equal to or higher than a reference number of ignition on/off operations.

5. The vehicle according to claim 1, wherein the monitoring unit monitors the number of position change times of a gearshift; and the communication control device determines that the setup condition is satisfied when the number of position change times of the gearshift is equal to or higher than a reference number of position change times of the gearshift.

6. The vehicle according to claim 1, wherein the monitoring unit monitors the number of manipulation times of a wiper control lever; and
the communication control device determines that the setup condition is satisfied when the number of manipulation times of the wiper control lever is equal to or higher than a reference number of manipulation times of the wiper control lever.

7. The vehicle according to claim 1, wherein the monitoring unit monitors the number of ON operations of a turn indicator lamp; and
the communication control device determines that the setup condition is satisfied when the number of ON operations of the turn indicator lamp is equal to or higher than a reference number of ON operations of the turn indicator.

8. A method for controlling a vehicle including a communication control device and a plurality of electronic control units (ECUs), the method comprising:
monitoring a state of the vehicle;
determining whether a setup condition of a security diagnostic routing module is satisfied on the basis of the monitored vehicle state;
if the monitored vehicle state satisfies the setup condition of a security diagnostic routing module, activating the security diagnostic routing module; and
if a diagnostic device is connected to an interface of the communication control device, controlling security diagnostic routing between the diagnostic device and at least one ECU of the plurality of ECUs using the security diagnostic routing module,
if the monitored vehicle state does not satisfy the setup condition of the security diagnostic routing module, controlling general diagnostic routing between the diagnostic device and the at least one ECU using a general diagnostic routing module; and
if the security diagnostic routing module is activated; deactivating the general diagnostic routing module,
wherein the monitoring of the vehicle state includes: monitoring a mileage of the vehicle and the number of opening/closing times of doors provided in the vehicle;
wherein the determining of whether the setup condition of the security diagnostic routing module is satisfied on the basis of the monitored vehicle state includes: determining that the setup condition is satisfied when the mileage is equal to or longer than a reference distance; and determining that the setup condition is satisfied when the number of door opening/closing times is equal to or higher than a reference number of door opening/closing times.

9. The method according to claim 8, further comprising if the diagnostic device is connected to the interface of the communication control device, authenticating the diagnostic device; and
if the diagnostic device is successfully authenticated, controlling security diagnostic routing between the at least one ECU and the diagnostic device through the communication control device; and if authentication of the diagnostic device fails, denying the security diagnostic routing between the at least one ECU and the diagnostic device through the communication control device.

10. The method according to claim 8, wherein the step of monitoring the vehicle state further includes monitoring at least one of a speed of the vehicle, the number of ignition ON/OFF operations, the number of position change times of a gearshift, the number of manipulation times of a wiper control lever, and the number of ON operations of a turn indicator lamp.

11. The method according to claim 8, further comprising if the diagnostic device is initially connected to the interface of the communication control device, activating the security diagnostic routing module.

* * * * *